US006851605B2

(12) United States Patent
Peebles et al.

(10) Patent No.: US 6,851,605 B2
(45) Date of Patent: Feb. 8, 2005

(54) SELF SERVICE TERMINAL MEDIA LOADING AND STORAGE DEVICE

(75) Inventors: John A. Peebles, Dundee (GB); John L. Martin, Stirling (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/691,217

(22) Filed: Oct. 22, 2003

(65) Prior Publication Data

US 2004/0084522 A1 May 6, 2004

(30) Foreign Application Priority Data

Nov. 2, 2002 (GB) ............................................ 0225596

(51) Int. Cl.[7] ................................................ G06F 17/60

(52) U.S. Cl. ....................... 235/379; 235/380; 235/451; 235/487; 235/492

(58) Field of Search ................................ 235/379, 475, 235/380, 492, 487, 451; 53/532; 270/58.04; 209/534; 194/206; 221/13; 232/43.3

(56) References Cited

U.S. PATENT DOCUMENTS 4,838,480 A * 6/1989 Takahashi et al. ......... 232/43.3

FOREIGN PATENT DOCUMENTS

| | | | |
|---|---|---|---|
| GB | 2 313 622 | A | 12/1997 |
| WO | WO 94/17274 | | 8/1994 |

* cited by examiner

*Primary Examiner*—Karl D Frech
*Assistant Examiner*—Ryan Lepisto
(74) *Attorney, Agent, or Firm*—Michael Chan

(57) ABSTRACT

A media storage device for use in self service terminals (SSTs) is described. The storage device comprises a media storage container 28 including flexible fingers 30 protruding into the interior of the container, and a media loading assembly 26 including a movable plate 44 which can be operated to transfer media from the loading assembly 26 to the container 28. The flexible fingers 30 serve to retain stored media in a compact and ordered arrangement, so improving storage efficiency. Embodiments of the invention may also include a scissor type arrangement of arms 54 in the loading assembly 26, arranged to increase the effective stroke length of the movable plate 44 without increasing the required depth of the loading assembly.

7 Claims, 4 Drawing Sheets

SELF SERVICE TERMINAL MEDIA LOADING AND STORAGE DEVICE

BACKGROUND OF THE INVENTION

The present invention relates to an apparatus for storage of media, for example, banknotes, checks, envelopes, and the like. Further aspects of the invention relate to self service terminals (SSTs) incorporating such a media storage apparatus. Aspects of the invention also relate to a media loading device for use with an apparatus for storage of media.

Self service terminals (SSTs), such as automated teller machines (ATMs), are commonly used by customers to make deposits into bank accounts. These deposits may take the form of cash such as banknotes, or checks, and may be deposited loose, or within an envelope or the like. Each of these forms of deposit will be termed 'media'. SSTs may also accept media deposits for other transactions; for example, to accept payment for goods or services.

SSTs which accept media deposits must be able to store the deposits securely until such time as an authorized operator may attend the SST to remove any deposited media. This means that the SST must be sufficiently large to accommodate the volume of media which is likely to be deposited between operator attendances. However, there is also a pressure for the SST to be as small as practical, since SSTs with a large footprint will decrease available space for other facilities to be available to customers.

Conventional media deposit handling systems operate by means of gravity-assisted delivery of media to a secure container. When media is deposited into the SST by a customer, the media is received in a bunch note acceptor module, which feeds bundles of media vertically, short edge leading, through an opening in the top of a security enclosure into a removable container within that area. The delivery is purely gravity dependent on entry into the container. This has the result that media items accumulate essentially randomly in an unordered fashion within the container, leading to an inefficient packing and use of space within the container. The capacity of the container is therefore significantly less than may be achieved by more efficient packing means.

BACKGROUND OF THE INVENTION

It is among the objects of embodiments of the present invention to obviate or alleviate these and other disadvantages of known media deposit handling systems.

According to a first aspect of the present invention, there is provided a media storage device comprising:

a media container for receiving media items to be stored, the media container comprising media retaining means for retaining media items received therein in a predetermined orientation;

a media loading assembly positionable before an opening of the container to allow media to be loaded into the container; and media transfer means for transferring media from the loading assembly to the media retaining means.

This arrangement allows media to be positively transferred into a storage container by a media transfer means, so removing the reliance on gravity assisted delivery. This permits more organized delivery of media into the container, and hence more efficient packing of media into the container thereby increasing capacity. Further, the media retaining means allows media items to be retained in a particular orientation; thus, if the media items are transferred to the media container in a stacked, upright orientation, the media items will remain in this orientation. This also assists efficient packing and storage of media items, so increasing effective storage capacity.

Preferably the media retaining means permits media to pass into the container, while restricting media from passing out of the container the same way. Multiple retaining means may be provided, dividing the interior of the container into a plurality of connected sections. This arrangement allows media items to be passed into the container, where they accumulate within one of the sections. As the section is filled by the media loading means, media items pass from the full section into the next adjacent section. The provision of multiple sections not only retains media items within the container, but also provides restricted spaces for the media items, so reducing the risk of media becoming disarrayed and filling more space than necessary.

The media retaining means may comprise resilient flaps, fingers, or the like, extending into the interior of the container. The flaps are conveniently resilient enough to be deformed by the media transfer means or by a bundle of media passing therethrough, yet strong enough to resist media deforming the flaps when not being pushed. Alternatively, hinged panels or other one-way arrangements may be used. A further alternative retaining means is a spring plate or the like, which urges against stored media items to retain the items in the desired orientation, although such a retaining means does not provide one-way entry of media items into the container. A combination of types of retaining means may be used—for example, resilient fingers along the length of the container, together with a spring plate at the rear of the container.

Preferably the media loading assembly further comprises coupling means for coupling a drive means to the media transfer means, arranged to multiply linear movement of the drive means, such that a particular linear movement of the drive means results in an increased linear movement of the media transfer means. The coupling means thus magnifies any movement of the drive means to permit the media transfer means to be moved further for a given drive. This has the advantage that the media loading assembly may be shallower than would otherwise be possible; using a direct linkage between the drive means and the media transfer means requires a deeper loading assembly, so reducing the storage space available for media. If a shallower loading assembly is nonetheless used, the transfer means is unable to transfer media as effectively, leading to reduced ordering of the media, and a less efficient packing; thus the effective media storage volume is reduced.

Preferably the coupling means comprises an extending arm pivotally mounted to define forward and rearward portions, the forward portion being connected to the media transfer means, with the pivotal mounting being linearly movable by a drive means. The extending arm may be directly mountable to a drive means, or may be indirectly mountable thereto. Preferably the media loading assembly further comprises means for limiting forward movement of the rearward portion of the extending arm. This causes the extending arm to move forward with a drive means until the limiting means is activated, whereupon the extending arm pivots on the pivotal mounting, so continuing to urge the media transfer means forward to a greater extent than the drive means will move linearly. The means for limiting movement of the extending arm may comprise a stop against which a corresponding protrusion from the extending arm may abut. Conveniently the stop may be in the form of the end of a track or opening within which the protrusion may run. The protrusion may take the form of a pin passed through the extending arm. Where multiple extending arms are present, the pin may pass through two or more of the extending arms.

Preferably the coupling means comprises a plurality of extending arms; preferably each extending arm is paired with a corresponding extending arm having a different orientation. That is, two extending arms may be provided which cross one another; this provides a 'scissor'-like action when the pusher means is extended. Extending arms, or extending arm pairs, may be provided to either side of the media loading assembly.

Preferably the media transfer means comprises a pusher plate. The pusher plate may be generally sized and shaped to conform to the dimensions of media to be transferred. The plate may preferably be profiled or otherwise shaped to complement a profiled or shaped opening in the media storage container. Where the media container comprises resilient flaps or fingers, then this permits the flaps or fingers to return to their rest position when the pusher means has passed the flaps, so causing media items to remain within the container when the transfer means is retracted therefrom.

Preferably the media storage device further comprises drive means coupled to the media transfer means. Preferably the drive means is a linear drive means. The drive means may comprise for example a piston arrangement or the like. Preferably the drive means comprises a rack and pinion arrangement. Multiple racks and pinions may be used, with the pinions being coupled so as to drive at the same rate. This allows for smooth movement of the media transfer means. Where multiple pinions are coupled, a single pinion may be driven, with the remaining pinions being coupled to the driven pinion by for example intermediate gearing.

Preferably the media loading assembly further comprises means for receiving media on the media transfer means. This may comprise a slot or other opening adjacent the media transfer means. Preferably the means for receiving media permits asymmetric media to be received short edge leading. The media loading assembly may be movable to specifically address a slot or opening, or to address a media container opening as appropriate.

Preferably the media loading assembly is suitably sized to receive media items therein and to retain items in a desired orientation. For example, where the media to be received comprises banknotes, the media loading assembly may be generally banknote-shaped, in the form of a shallow box. This allows the assembly to receive a bundle of notes and retain them in an upright orientation.

Preferably the media container comprises a plurality of media receiving subcontainers. Conveniently the media container and the media loading assembly are relatively movable, to permit the loading assembly to address each subcontainer separately. This may be achieved by mounting the loading assembly on a drive track. The provision of multiple subcontainers and a movable loading assembly permits media items to be sorted into separate subcontainers; for example, different denominations of banknotes may be delivered to different subcontainers.

Preferably the container further comprises means for permitting access to media therein for unloading of stored media. This may comprise doors, removable subcontainers, hatches, automated unloading mechanisms, and the like.

Preferably the opening of the media container is selectively closable. For example, the opening may be arranged to automatically close when the container is removed from a mounting, or to close when the media loading assembly is not positioned adjacent the container. This allows secure closure of the container for transport, maintenance, and the like, without providing access to the contents to unauthorized individuals. Conveniently the media container may comprise a slidable door closure arranged to close the opening when the media loading assembly is not present.

Preferably the media storage device forms part of a self service terminal. Alternatively, the media storage device may be a standalone device, or may form part of a media sorting and storage assembly.

According to a second aspect of the present invention, there is provided a media loading assembly for use with a media storage device, the media loading assembly comprising:

media transfer means for transferring media from the loading assembly to a media storage container; and coupling means for coupling a drive means to the media transfer means, arranged to multiply linear movement of the drive means, such that a particular linear movement of the drive means results in an increased linear movement of the media transfer means.

According to a further aspect of the present invention, there is provided a self service terminal (SST) comprising:

user interaction means for interacting with a user;

media deposit means for receiving media from a user;

a media container for receiving deposited media items, the media container comprising media retaining means for retaining media items received therein in a predetermined orientation;

a media loading assembly positionable before an opening of the container to allow media to be loaded into the container; and media transfer means for transferring media from the loading assembly to the retaining means.

Preferably the media loading assembly further comprises coupling means for coupling a drive means to the media transfer means, arranged to multiply linear movement of the drive means, such that a particular linear movement of the drive means results in an increased linear movement of the media transfer means.

Preferably the user interaction means comprises means for providing information to the user, and means for receiving instructions from the user. The information providing means may comprise a display screen or the like. The instruction receiving means may comprise a keypad, touch sensitive screen, pointing device, or the like.

The media deposit means may comprise a media deposit aperture for receiving media items, and for passing received items to the media loading assembly.

BRIEF DESCRIPTION OF THE DRAWINGS

These and other aspects of the present invention will now be described by way of example only and with reference to the accompanying drawings, in which.

DETAILED DESCRIPTION

Figure 1:
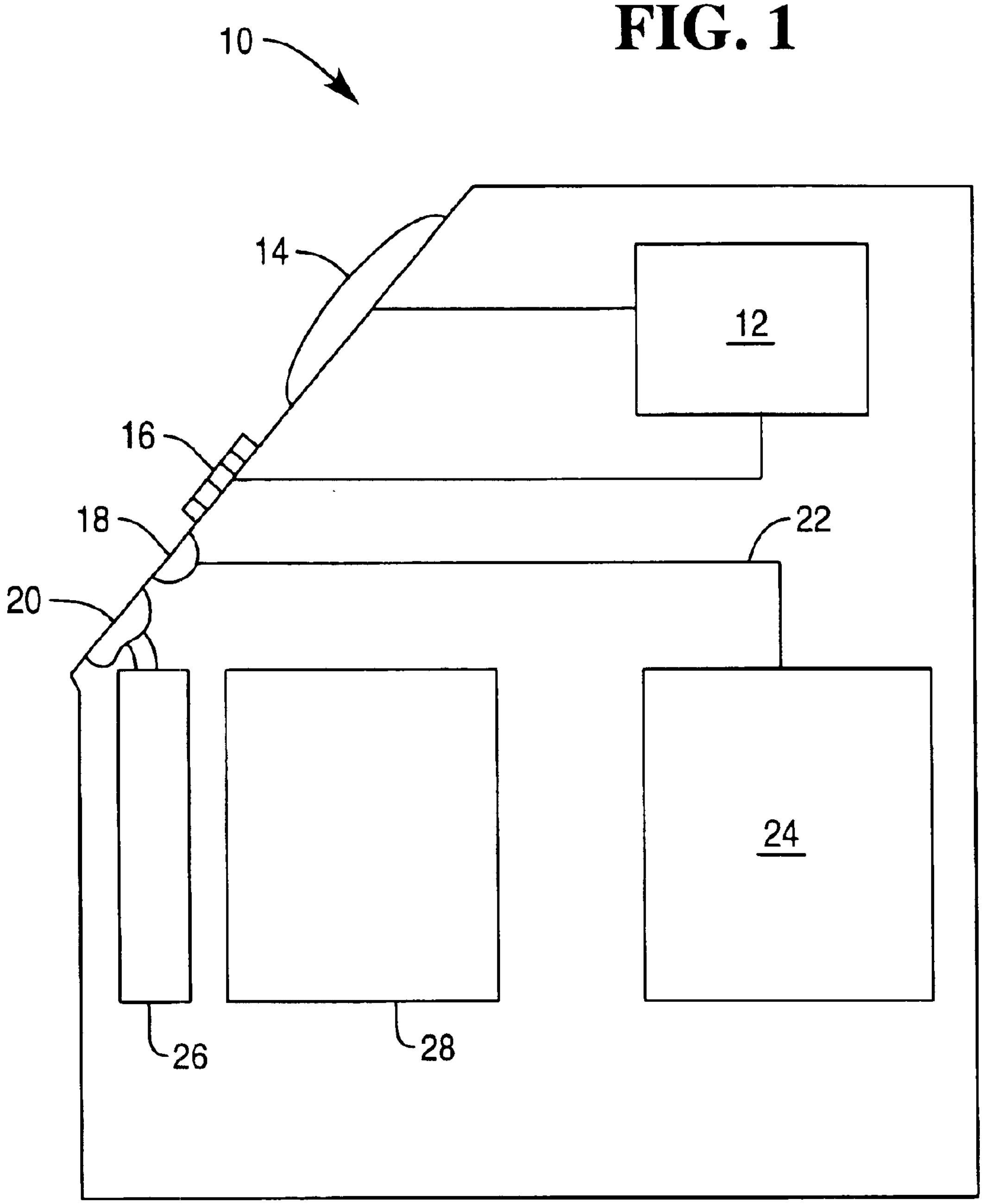
FIG. 1 shows a self service terminal in accordance with an aspect of the present invention.

Referring first of all to FIG. 1, this shows a self service terminal (SST) 10, which includes a data processor unit 12, connected to and controlling a display screen 14 and a data input keypad 16, which are mounted in the fascia of the SST 10. The SST fascia also includes a media dispense slot 18, and a media deposit slot 20. The media dispense slot 18 is connected by a media transport path 22 to a media safe 24, which contains media to be dispensed from the SST. The media deposit slot 20 receives media deposited by a user, and passes it, short edge leading, to a media loading assembly 26. The media loading assembly 26 transfers the media into a media container 28, which may securely store deposited media until the SST may be attended and the media collected by the operator.

Figure 2:
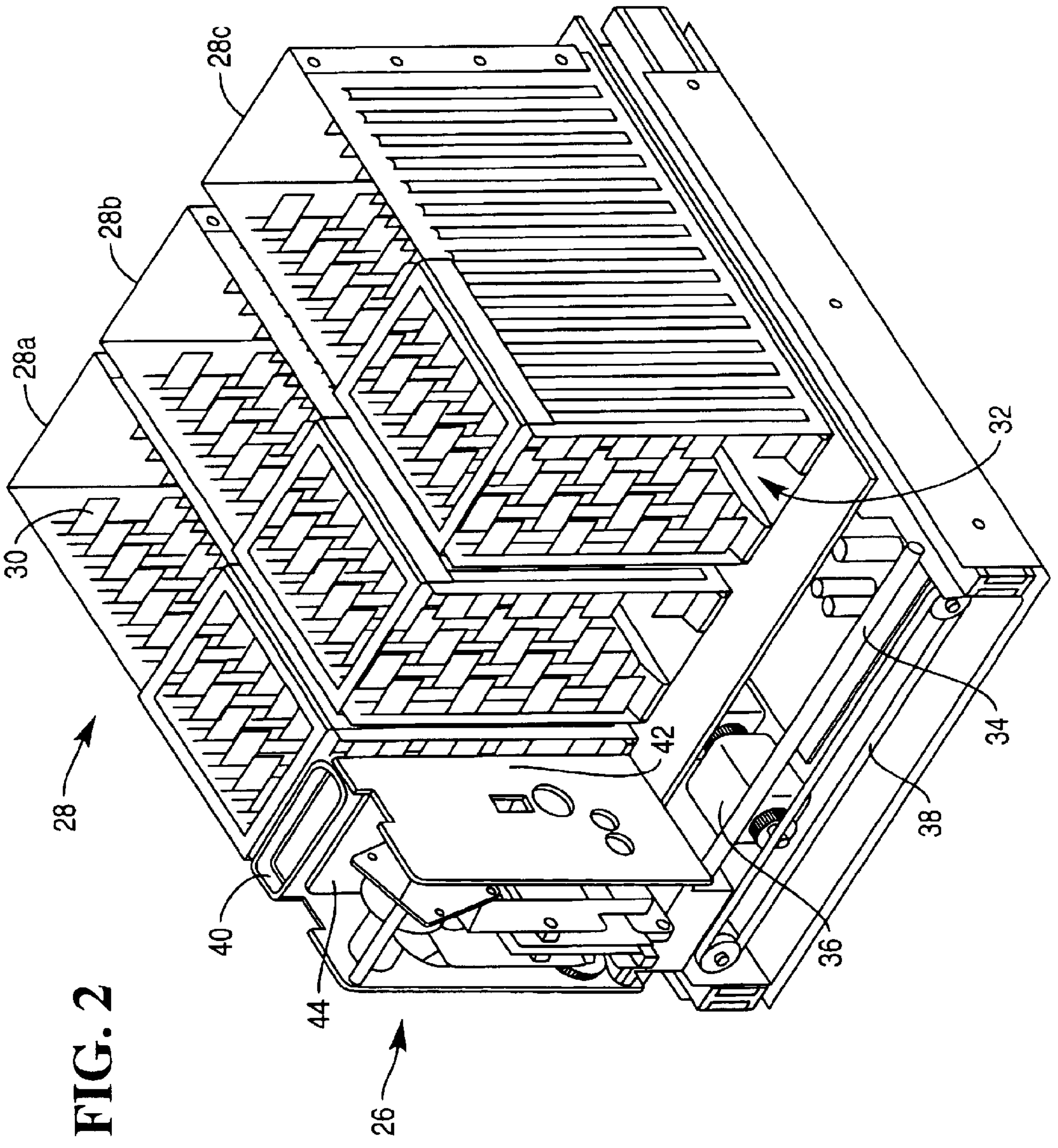
FIG. 2 shows a media storage device as used in the SST of FIG. 1.

The construction and operation of the media loading assembly 26 and media container 28 will now be described in more detail, with reference to FIG. 2. The media container 28 comprises three subcontainers 28*a*, 28*b*, 28*c*, each of which is of suitable height and width to accommodate media items short edge horizontal. Within each of the subcontainers is a series of flexible fingers 30 extending into the interior of the subcontainer, and dividing the subcontainer into a number of sections. Each section is deep enough to accommodate a number of media items. The front 32 of each of the subcontainers is open to permit media items to be loaded into the subcontainers.

The media loading assembly 26 is mounted on a horizontal rail 34, and may be moved along the rail in order to address each of the subcontainers 28*a*, 28*b*, 28*c*, by means of a motor 36 and drive belt 38. The loading assembly 26 has an opening 40 at the top thereof, allowing entry of media items into the loading assembly. The region into which the media items enter is bounded by a pair of side walls 42, and a bottom plate (not shown), as well as a media pusher plate 44 to the rear. This creates a relatively small volume in which media items will be retained in an ordered manner.

The media pusher plate 44 may be moved backwards and forwards in a manner described below, to push media items from the loading assembly 26 into the container 28. The pusher plate 44 is profiled in a complementary manner to the fingers 30 of the subcontainers. This allows the plate 44 to pass through the fingers 30 without displacing them when the plate 44 is empty; when the plate is carrying media items, however, the media items will cause the fingers 30 to be displaced. This arrangement results in the media items being able to be passed into the container 28, by displacing the fingers 30, but they will not be able to leave the container 28 by the same route, since the fingers 30 will not be displaced by the media items alone in the opposite direction. Further, as media items are loaded into the container, they will push previously-loaded media items farther into the container and into subsequent sections, by displacement of the flexible fingers 30. This allows the media items to be loaded into the container and to be retained in an ordered manner by virtue of the relatively shallow compartments within each of the subcontainers, yet the overall volume of the subcontainer is relatively large, so that many media items may be stored therein.

In addition to the flexible fingers 30, the container and media loading assembly may be provided with hinged flaps which are opened by the media pusher plate. This arrangement helps to keep the container and loading assembly closed when media is not being loaded.

The container may also be provided with a roller door arrangement (not shown in these Figures) which may be slid open or shut by engagement with the moving media loading assembly. When the loading assembly is moved to an extreme side position, the roller door will close the container completely. This allows the container to be removed from the SST without permitting access to the contents. The SST may further be configured to ensure that the roller door is completely closed before allowing access to the interior of the SST; this may be achieved by software control, or mechanical interlocking, or a combination thereof.

Figure 3:
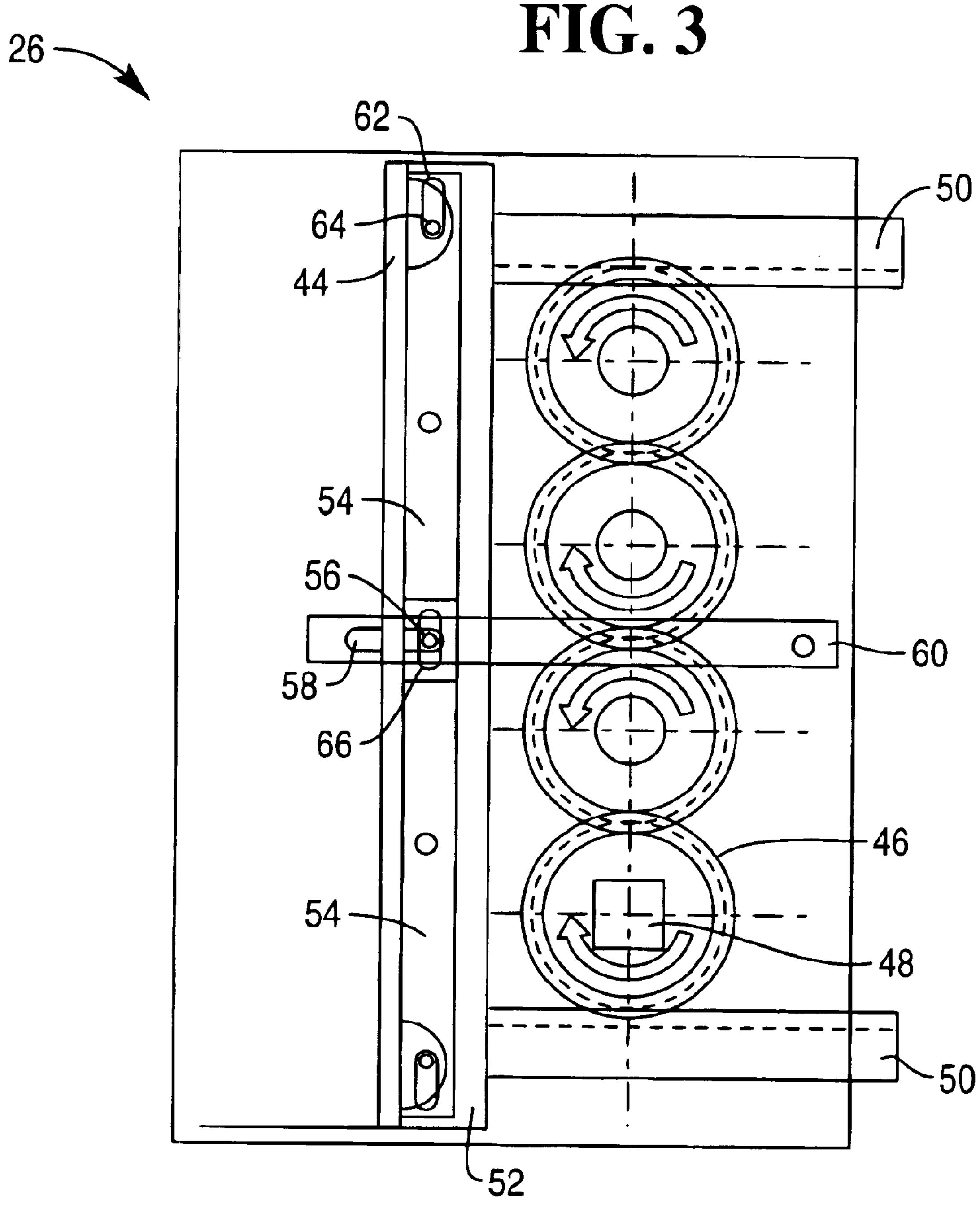
FIGS. 3 and 4 show the media loading assembly of FIG. 2 in more detail, in retracted and extended positions respectively.
Figure 4:
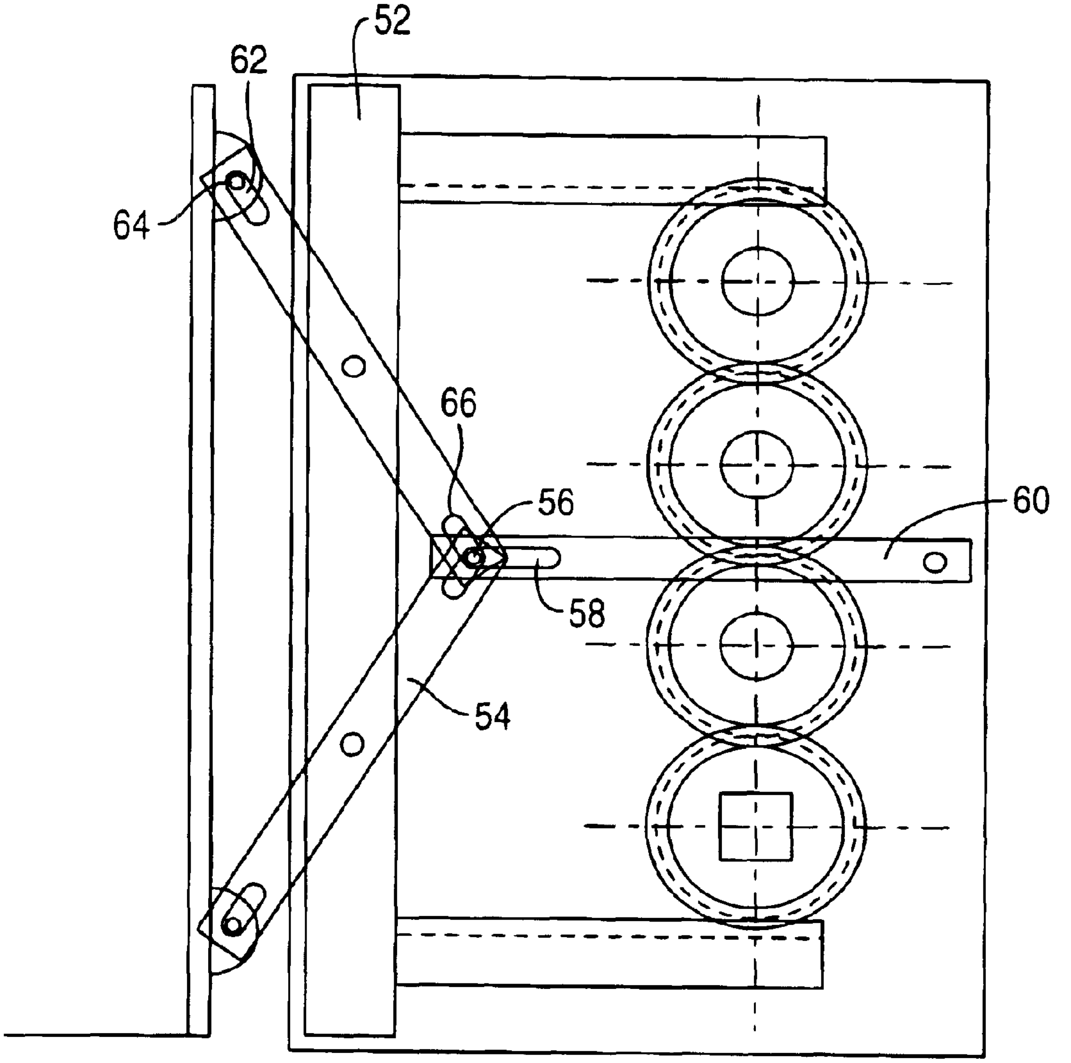

The operation and construction of the media loading assembly 26 will now be described with reference to FIGS. 3 and 4, which show schematically the loading assembly 26 with the pusher plate 44 in retracted and extended positions respectively. The loading assembly 26 includes a series of cogwheels 46, with the lowermost wheel 46 being mounted on a driven square drive shaft 48. All cogwheels 46 are driven from this drive shaft 48. The uppermost and lowermost cogwheels 46 are mounted to toothed racks 50, which will thus be moved backward and forward as the cogwheels are turned. Mounted to the racks 50 is a vertical plate 52 to which is pivotally mounted a pair of extending arms 54, which themselves carry the pusher plate 44 and are pivotally connected thereto. A corresponding pair of extending arms is provided on the opposite side of the loading assembly.

Defined in the ends of the arms 54 that carry the pusher plate 44 are elongate slots 62. Movable within each of these slots is a pin 64 that is mounted on the pusher plate 44. Defined in the ends of the extending arms 54 which are not secured to the pusher plate 44 are further elongate slots 66, both of which receive a pin 56 that is movable within the elongate slots 66 and an elongate opening 58 defined within a fixed bar 60.

The slots 62, 66 in the extending arms 54 are intended to permit extended movement of the arms 54 and the pusher plate 44. In the fully retracted position (FIG. 3), the pins 64 mounted on the pusher plate 44 are at the innermost end of the slots 62, while the pin 56 located within the fixed bar 60 is at a central position within the further slots 66. In the extended position (FIG. 4), the pins 56, 64 have moved to the other ends of the slots 62, 66 so permitting additional forward movement of the pusher plate 44, as will be described below.

As the cogwheels 46 are turned to move the racks 50 forward, the vertical plate 52 is moved forward carrying the extending arms 54 and pusher plate 44 with it. The pin 56 also moves forward within the opening 58 in the fixed bar 60, until reaching the forward end of the opening 58. This prevents the rear end of the extending arms 54 from moving further forward, causing the extending arms 54 to pivot on the vertical plate 52, so that the arms 54 extend outward in a scissor-type movement. Further forward movement of the racks 50 causes the pins 64 to be pushed to a forward position in the elongate slots 62, thereby carrying the pusher plate 44 further forward than the vertical plate 52. When the pusher plate is to be retracted, a similar movement occurs.

This arrangement allows a greater forward stroke to be achieved than would be possible with a simple rack and pinion arrangement on its own. The depth of the media loading assembly may therefore be decreased without reducing the size of stroke. The arrangement used is also mechanically reliable, and so unlikely to jam.

It will be understood that, although the loading assembly and storage container have been described herein primarily with reference to self service terminals, they may be used in other applications in which media storage or sorting is necessary; for example, sorting and storage of mail.

What is claimed is:

1. A media storage device comprising:

a media container including (i) at least one wall portion defining an interior chamber, and (ii) a plurality of flexible members disposed on the at least one wall portion and extending into the interior chamber to define a first chamber section and a second chamber section in which media items can be retained; and a media loading assembly for moving a media item in a first direction through the first chamber section and past the plurality of flexible members into the second chamber section such that (i) the flexible members are displaced when the media item moves in the first direction from the first chamber section to the second chamber section, and (ii) the flexible members co-operate to prevent the media item from moving in a second direction which is opposite the first direction from the second chamber section back to the first chamber section and thereby to retain the media item in the second chamber section.

2. A storage device of claim 1, wherein the media loading assembly includes (i) a transfer mechanism movable between a retracted position and an extended position and for engaging a media item to move the media item in the first direction through the first chamber section and past the plurality of flexible members into the second chamber section as the transfer mechanism moves from the retracted position to the extended position, (ii) a drive mechanism, and (iii) a coupling which couples the drive mechanism to the transfer mechanism to multiply linear movement of the drive mechanism such that a particular linear movement of the drive mechanism results in an increased linear movement of the transfer mechanism as the transfer mechanism moves from the retracted position to the extended position to move the media item in the first direction through the first chamber section and past the plurality of flexible members into the second chamber section.

3. A storage device of claim 2, wherein the coupling comprises an extending arm including (i) a rearward portion pivotally connected to the drive mechanism, and (ii) a forward portion pivotally connected to the transfer mechanism such that linear movement of the drive mechanism is multiplied resulting in increased linear movement of the transfer mechanism when the drive mechanism moves linearly towards the transfer mechanism.

4. A storage device of claim 1, wherein the media container and the media loading assembly are movable relative to one another.

5. A self-service terminal comprising:

user interaction means for interacting with a user;

media deposit means for receiving media from a user;

a media container for receiving deposited media items, the media container including (i) at least one wall portion defining an interior chamber, and (ii) a plurality of flexible members disposed on the at least one wail portion and extending into the interior chamber to define a first chamber section and a second chamber section in which media items can be retained; and a media loading assembly for moving a media item in a first direction through the first chamber section and past the plurality of flexible members into the second chamber section such that (i) the flexible members are displaced when the media item moves in the first direction from the first chamber section to the second chamber section, and (ii) the flexible members co-operate to prevent the media item from moving in a second direction which is opposite the first direction from the second chamber section back to the first chamber section and thereby to retain the media item in the second chamber section.

6. A self-service terminal of claim 5, wherein the media loading assembly includes (i) a transfer mechanism movable between a retracted position and an extended position and for engaging a media item to move the media item in the first direction through the first chamber section and past the plurality of flexible members into the second chamber section as the transfer mechanism moves from the retracted position to the extended position, (ii) a drive mechanism, and (iii) a coupling which couples the drive mechanism to the transfer mechanism to multiply linear movement of the drive mechanism such that a particular linear movement of the drive mechanism results in an increased linear movement of the transfer mechanism as the transfer mechanism moves from the retracted position to the extended position to move the media item in the first direction through the first chamber section and past the plurality of flexible members into the second chamber section.

7. A self-service terminal comprising:

interaction means for interacting with a user depositing banknotes;

deposit means for receiving banknotes from a user depositing banknotes;

a banknote container for receiving deposited banknotes from a user depositing banknotes, the banknote container including (i) at least one wall portion defining an interior chamber, and (ii) a plurality of flexible members disposed on the at least one wall portion and extending into the interior chamber to define a first chamber section and a second chamber section in which deposited banknotes can be retained; and a banknote loading assembly for moving a deposited banknote in a first direction through the first chamber section and past the plurality of flexible members into the second chamber section such that (i) the flexible members are displaced when the deposited banknote moves in the first direction from the first chamber section to the second chamber section, and (ii) the flexible members co-operate to prevent the deposited banknote from moving in a second direction which is opposite the first direction from the second chamber section back to the first chamber section and thereby to retain the deposited banknote in the second chamber section.

* * * * *